United States Patent [19]

Henning et al.

[11] 4,263,271
[45] Apr. 21, 1981

[54] PROCESS FOR ELIMINATING HYDROGEN SULFIDE FROM GAS MIXTURES

[75] Inventors: Klaus-Dirk Henning; Harald Jüntgen; Jürgen Klein, all of Essen, Fed. Rep. of Germany

[73] Assignee: Bergwerksverband GmbH, Essen, Fed. Rep. of Germany

[21] Appl. No.: 68,321

[22] Filed: Aug. 20, 1979

Related U.S. Application Data

[63] Continuation of Ser. No. 886,910, Mar. 15, 1978, abandoned.

[51] Int. Cl.$^3$ .............................................. C01B 17/04
[52] U.S. Cl. .................................. 423/573 G; 423/576
[58] Field of Search ................ 423/230, 573, 574, 576

[56] References Cited

U.S. PATENT DOCUMENTS

| | | | |
|---|---|---|---|
| 1,479,852 | 1/1928 | Engelhardt | 423/573 X |
| 1,984,971 | 12/1934 | Herold et al. | 423/574 X |
| 3,634,028 | 1/1972 | Hohve | 423/230 X |
| 3,702,884 | 11/1972 | Hunt et al. | 423/574 X |
| 3,790,659 | 2/1974 | Storp et al. | 423/573 X |

FOREIGN PATENT DOCUMENTS

| | | | |
|---|---|---|---|
| 551195 | 1/1958 | Canada | 423/574 |
| 374358 | 4/1923 | Fed. Rep. of Germany | 423/573 |
| 689664 | 4/1951 | United Kingdom | 423/576 |
| 717483 | 10/1954 | United Kingdom | 423/576 |

*Primary Examiner*—G. O. Peters
*Attorney, Agent, or Firm*—Michael J. Striker

[57] ABSTRACT

In a process for eliminating impurities and undesirable components from gas mixtures by passing the mixture through an activated carbon-containing adsorber. Sulfur compounds including hydrogen sulfide are eliminated by increasing the oxygen contents of the gas mixture which contains at least oxygen and/or sulfur dioxide in addition to the hydrogen sulfide to an extent that a hydrogen sulfide oxygen molar ratio is obtained in the gas mixture which is between about 1:0.45 and 1:0.65. The process may also be carried out with two groups of adsorbers where in the first adsorber the elemental sulfur is eliminated in liquid form and where the remaining minor portion of sulfur in vaporous or mist-like form is then removed in the second group of adsorber or adsorbers by adsorption on the activated coal. The purified gas is then recovered from the adsorber or with two groups of adsorbers from the second group of adsorber or adsorbers and the activated carbon is subjected to periodic regeneration cycles.

11 Claims, 2 Drawing Figures

PROCESS FOR ELIMINATING HYDROGEN SULFIDE FROM GAS MIXTURES

This is a continuation of application Ser. No. 886,910, filed Mar. 15, 1978 now abandoned.

BACKGROUND OF THE INVENTION

The invention relates to a process for eliminating sulfur compounds, in particular hydrogen sulfide from gases containing the same and containing in addition oxygen and/or sulfur dioxide by means of activated carbon adsorption at an elevated temperature between about 120 and 240° C.

In these processes the $H_2S$ is subject to oxidation on the activated coal and there is thus then obtained elementary sulfur in liquid form at the bottom end of the adsorber.

If the feed gas contains amounts below the stoichiometric amount of oxygen and sulfur dioxide these oxidation agents are subject to complete reaction according to the following equations.

$$2H_2S + O_2 \rightarrow 2H_2O + S_2 \qquad \text{I}$$

$$4H_2S + 2SO_2 \rightarrow 4H_2O + 3S_2 \qquad \text{II}$$

The unreacted portion of the hydrogen sulfide is then adsorbed in a second adsorber filled with activated carbon in order to obtain complete desulfurization of the gas.

However, if the gas contains the oxygen in a stoichiometric excess as against the hydrogen sulfide the formed elemental sulfur is further converted to sulfur dioxide. The result is that in the subsequent adsorber more or less substantial amounts of sulfur dioxide must be adsorbed in order to obtain a well-purified gas. It is a serious shortcoming for the economies of the process that usually either hydrogen sulfide or sulfur dioxide remain in the gas which likewise must be adsorbed in the subsequent adsorber and must be subject to further processing.

SUMMARY OF THE INVENTION

It has now been found that the described processes can be carried out with a practically complete elimination of sulfur compounds and recovery of only elementary sulfur in the adsorber and that it is furthermore possible in a second adsorber arranged subsequently to the first adsorber for the purpose of a high degree purification likewise to obtain exclusively elementary sulfur, that is, neither hydrogen sulfide nor sulfur dioxide.

This result can be obtained by adding oxygen to the feed gas in an amount that the gas components $H_2S$, $O_2$ and $SO_2$ are present in the gas to be purified in stoichiometric ratio relative to the above formulas I and II.

Though the reaction is carried out at the above-mentioned elevated temperature and the sulfur is obtained in a highly reactive condition, it is nevertheless possible to carry the oxidation of the hydrogen sulfide in spite of the presence of the activated coal only to the point of formation of elementary sulfur and thus to avoid a sulfur dioxide formation provided that the ratios are properly adjusted to maintain the above stoichiometric relationship.

In carrying out the invention oxygen is added to the hydrogen sulfide containing gas prior to its entry into the first adsorber in an amount to obtain the desired molar relationship in the gas. When these conditions are observed all sulfur compounds are obtained exclusively in the form of elementary sulfur which implies a higher degree of economy for the prior art processes, and at the same time a high degree of purification of the gas.

If the gas to be purified contains in addition to oxygen also sulfur dioxide it is possible to add the necessary oxygen amount according to the following relationship III:

Amount of
$$O_2(m_n^3/h) = \dot{V} \cdot (F/100) \cdot [\text{Vol.}\%H_2S - 2(\text{Vol.}\%SO_2 + \text{Vol.}\%O_2)] \qquad \text{III}$$

In this equation $\dot{V}$ is the amount of the gas to be purified in $m_n^3/h$, and $m_n^3$ = normal cubic meter and h stands for hour.

The factor F is a value between 0.45 and 0.65. The adjustment requires a determination of the amount of the individual gases consisting of hydrogen sulfide, sulfur dioxide and oxygen in the feed gas. The necessary oxygen can be added as pure oxygen, air or another oxygen rich gas.

It is also preferred particulary in case of high hydrogen sulfide contents to proceed according to a special embodiment of the invention by eliminating the predominant part of the elementary sulfur from the gas mixture at a temperature of above 120° C. in a first activated carbon containing adsorber in liquid form whereupon the sulfur vapor or mist remaining in the gas mixture is then taken up in a subsequent second adsorber. In this way the predominant amount of the formed sulfur drops from the catalyst in the first adsorber and can be removed from the adsorption process while the remaining sulfur is eliminated from the gas mixture by adsorption in the following adsorber.

The great advantage of this embodiment is the fact that the activated carbon in the first adsorber, since it is continuously subject to auto-regeneration, only very infrequently requires a replacement and that furthermore the activated carbon in the subsequent adsorber is also effective for comparatively long periods of time since at this place the supply of sulfur, that is the charge of the adsorber is considerably reduced.

In case of low amounts of hydrogen sulfide in the feed gas and in case of reaction conditions in which the saturation vapor pressure of the sulfur is not exceeded it is preferred to adsorb the hydrogen sulfide in the form of sulfur in two alternatingly operating adsorbers. In this case a dropping out of the liquid sulfur from the adsorber does not occur since prior to this phenomenon the adsorption capacity of the activated carbon for the sulfur will be exhausted and an increase of hydrogen sulfide contents in the discharge gas will occur. This one-stage process is preferred at hydrogen sulfide contents below 2 g $H_2S/m^3$, temperatures between 120° and 240° C. and pressures between 1 and 50 bar.

The activated carbon which has been saturated with sulfur is treated with a hot inert gas of 300° to 600° C. for regeneration purposes. The sulfur in this case flows out of the adsorber and may be recovered.

If the hydrogen sulfide contents in the feed gas is high and the saturation vapor pressure of the sulfur is exceeded under the condition of reaction, for instance, at $H_2S$ contents $> 2$ g $H_2S/m^3$, a temperature of 150° C. and pressure of 15 bar, it is advisable to use the two-stage process. The second adsorber group in this case must, from time to time, be subjected to a regeneration treatment in the same manner as in the previously described single stage process. Depending on process conditions in this embodiment up to 80% of the sulfur flows out of the first adsorber in fluid form. The first adsorber generally can be operated for a time 10 to 20 times as long as the subsequent second adsorber. If a regeneration is necessary it is likewise carried out with hot inert gas.

The two-stage process is preferred in case of $H_2S$ contents above 2 g $H_2S/m^3$, temperatures of likewise 120° to 140° and pressures of likewise 1 to 50 bar.

A particular advantage of the invention is that together with the removal of the hydrogen sulfide there is also obtained a product gas which is substantially oxygen-free. An example for a necessary elimination of $H_2S$ and $SO_2$ with simultaneous obtaining of a substantial freedom of oxygen is the purification of a coal gasifier gas which is intended for methanization.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILS OF THE INVENTION AND PREFERRED EMBODIMENTS

Figure 1:
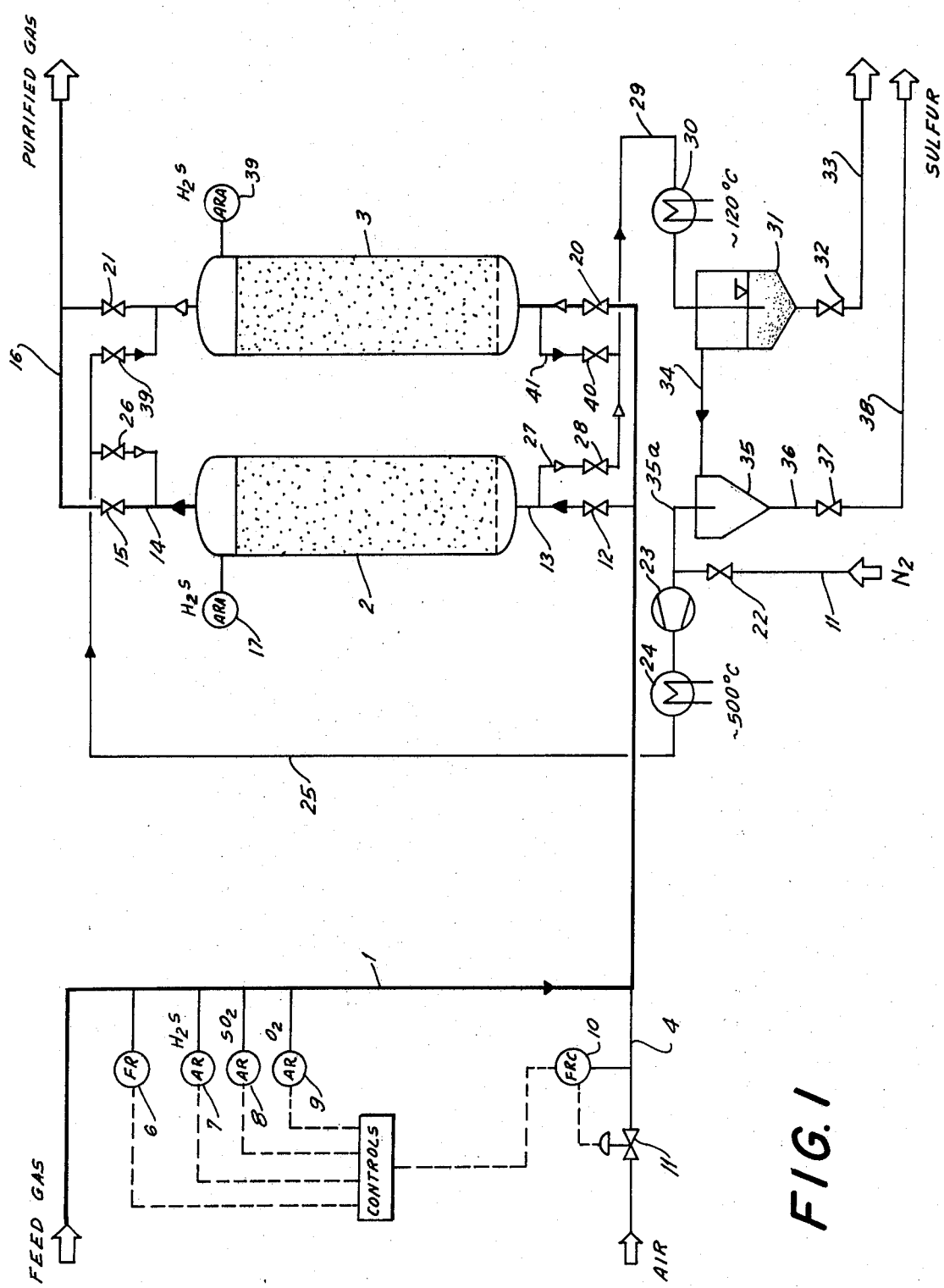
FIG. 1 shows in diagrammatic form an installation for the one-stage elimination of hydrogen sulfide by activated carbon containing adsorbers.

With reference first to FIG. 1 there is passed in this embodiment a hydrogen sulfide containing gas under pressure through a duct 1 into one of the two adsorbers 2 and 3 which both are filled with activated carbon. Simultaneously, oxygen, for instance in the form of air, is added through duct 4 under pressure into the duct 1. The dosage of oxygen is determined by the controls 5. These controls include measuring devices 6, 7, 8 and 9 which determine the gas amount and the contents of hydrogen sulfide, sulfur dioxide and oxygen in the feed gas from which, by means of the above equation III, the necessary amount of oxygen can be computed. Through the controls 5 this amount is then adjusted by means of the valve 11.

The symbols AR or FR are measurement-and control technical symbols and indicate that at that place the gas is analyzed (A=analysis, R=recording or that the amount of gas is determined (F=rate of flow, R=recording). The control 10 (FRC=rate of flow, recording and controls) then in connection with the valve 11 causes introduction of the required dosage of oxygen into the duct 1. The thus stoichiometrically adjusted feed gas then passes through valve 12 and duct 13 into the adsorber 2 which it leaves after purification through duct 14, valve 15, and duct 16.

The degree of purity of the discharged gas is determined by a measuring device 17 (ARA=analysis recording, alarm) which acts in response to increasing $H_2S$ contents in the off-gas. Increase of $H_2S$ contents signifies that the activation carbon is gradually losing its effectiveness as oxidation catalyst.

As soon as the alarm sounds from the device 17 the valves 20 and 21 open and the adsorber 3 is then charged with the exhaust gas while the valves 12 and 15 are closed. Regeneration of the activated carbon thereupon is effected in the adsorber 2. Inert gas, for instance nitrogen, is introduced through valve 22, blower 23, and heater 24, as well as valve 26 into adsorber 2. The desorbed sulfur flows together with the inert gas into the collector 31 through duct 27, valve 28, duct 29, and cooler 30. It is then passed through valve 32 and duct 33 to a collector vessel in which the sulfur after cooling is obtained as solid sulfur. The inert gas which is separated from the sulfur in the collector vessel 31 is recycled through duct 34, impingement-type separator 35 and duct 35a into the operation. From the separator 35 further sulfur is passed to the sulfur collector vessel through duct 36, valve 37 and duct 38.

After the activated carbon of the adsorber 3 has been saturated with sulfur and after a limit amount of hydrogen sulfide is signified by the alarm device 39, the feed gas introduction is again channeled to adsorber 2 by actuation of the valves 12, 15, 20 and 21. Simultaneously, the regeneration of the activated carbon in adsorber 3 is started by closing valves 26 and 27, and opening of the valve 39 and 40. Thus, the high temperature inert gas is caused to pass through the adsorber from the top towards the bottom end and can thus eliminate the sulfur via the duct 41, valve 40 and duct 29.

The actuation of the individual valves for the change from adsorption to desorption and vice-versa can also be effected automatically by electrical connections (not shown) by means of the devices 17 and 39.

For the oxidation and adsorption of sulfur, all activated carbon of a grain size between 1 and 10 and preferably between 3 and 6 mm may be suited. Particularly preferred is an activated carbon with a medium pore radius between 7 and 12 AE (angström units).

Figure 2:
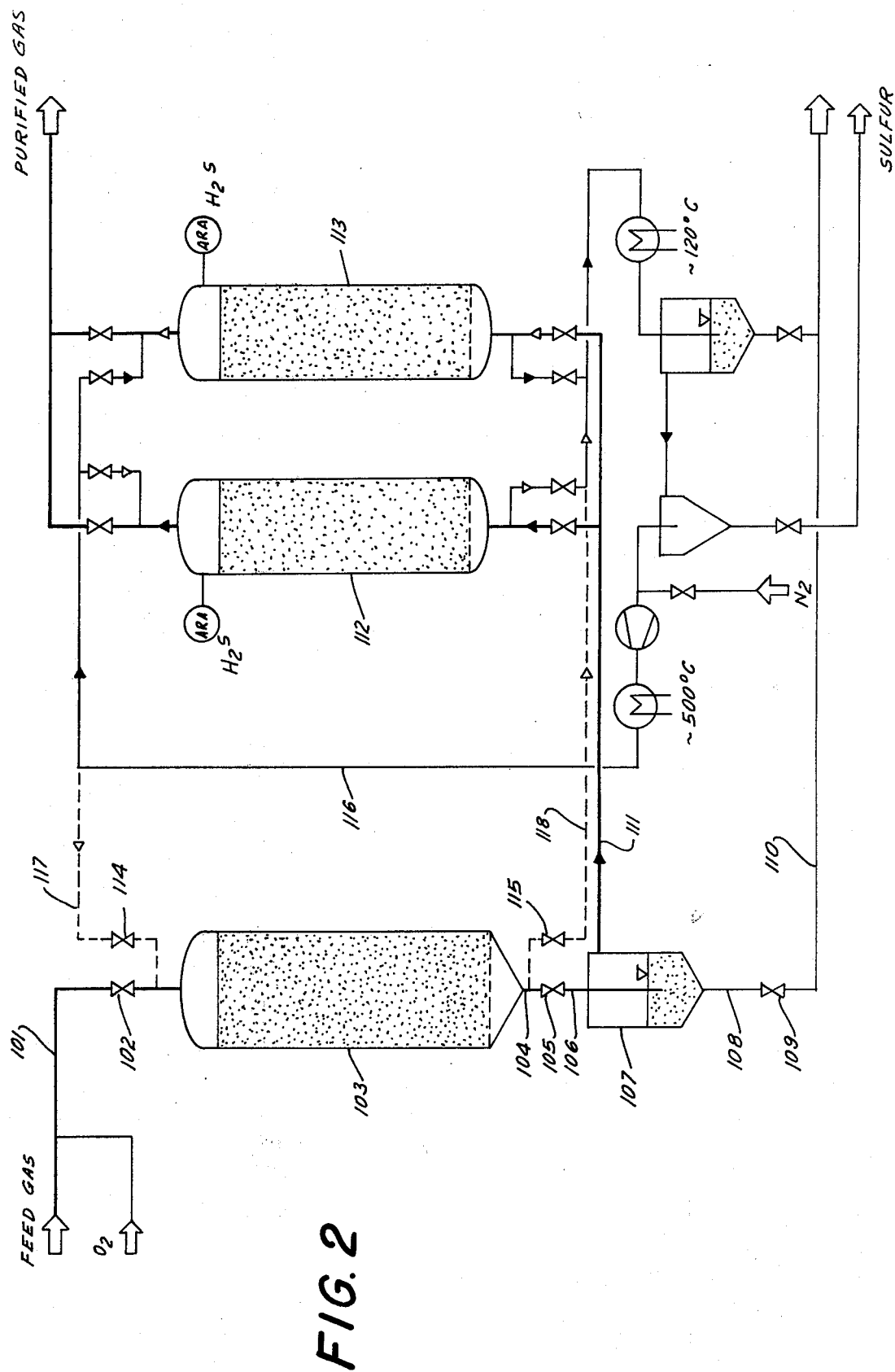
FIG. 2 shows the same elimination process in a two-stage method where in the first stage one adsorber and in the second stage two alternatingly operating adsorbers are used, the latter adsorbers having substantially the function as in the embodiment of FIG. 1.

If we now turn to FIG. 2 it will be seen that the hydrogen sulfide containing feed gas is introduced through duct 101 and valve 102 into the top portion of the adsorber 103. The temperature for the adsorption is in excess of 120° C. The introduction of the feed gas is effected after adding thereto the required amount of oxygen as in greater detail shown in FIG. 1. After saturation with sulfur, hot sulfur then flows into the vessel 107 via duct 104, valve 105 and duct 106. The liquid sulfur is then further passed through duct 108, valve 109 and duct 110 to a collecting place (not shown) where it is caused to solidify by cooling.

The partially purified gas which still contains minor amounts of sulfur vapors is then passed from the vessel 107 via duct 111 in alternating succession into the adsorbers 112 and 113 which are otherwise operated as described in greater detail in connection with FIG. 1.

The useful time of operation for the adsorber 103 is about 10 to 20 times as long as the corresponding time for the adsorbers 112 or 113. However, after some time has elapsed, a regenerative treatment of the activated carbon catalyst is also advisable for the adsorber 103. The feed gas supply is shut off for this purpose and if desired the feed gas during such time may be passed into a parallel identical installation. The valves 102 and 105 are closed while the valves 114 and 115 are opened to permit hot inert gases to enter the adsorber 103 through ducts 116 and 117 and the valve 114.

This regeneration may even be carried out during continued operation of the adsorber in which case the hot inert gas is merely discharged together with the additionally heated feed gas by way of valve 105, vessel 107 and duct 111. This manner of operation would only involve a temporarily greater stress on the subsequent adsorbers 112 and 113.

The sulfur which is recovered from the activated carbon is passed together with the hot inert gas via valve 115 and duct 118 to a collecting device for the sulfur, as has been further described in connection with FIG. 1.

The regeneration of the activated carbon is terminated after about 2 to 5 hours. The operation of the apparatus therefore can be resumed thereafter, that is after a comparatively short interruption.

Regarding the grain size used for the activated carbon in this installation the same applies as in case of the embodiment shown in FIG. 1.

However, since in the subsequent adsorbers 112 and 114 a fine purification of the gas is effected, it is preferred to use for these two adsorbers an activated carbon of a median pore radius of 5 to 8 AE.

The following examples will further illustrate the invention.

EXAMPLE 1

This example illustrates the operation according to the embodiment of FIG. 1.

A feed gas current of 100 $m_n^3/h$ with a hydrogen sulfide contents of 4.55 $g/m^3$ was passed at a temperature of 150° C. in alternating succession through the two adsorbers 2 and 3 which were filled with activated carbon. The diameter of the adsorbers was 37 cm and the height of the carbon bed was 1.5 m. Feed gas and added oxygen were introduced through the duct 1 at a pressure of 40 bar.

The control mechanism of this apparatus was then caused to process the measured values as described above according to the equation $$O_2\text{-amount}(m_n^3/h) = \dot{V} \cdot (F_1/100) \cdot [\text{Vol.}\%H_2S - 2(\text{Vol.}\%SO_2 = \text{Vol.}\%O_2)]$$

$\dot{V}$ = feed gas amount($m_n^3/h$)

F = 0.45–0.65

Once there was measured a hydrogen sulfide contents in the feed gas of 4.55 $g/m^3$ and an oxygen contents of 0.1 percent by volume an amount of oxygen had to be added of 0.060 $m_n^3 O_2/h$, the factor F being equal to 0.6.

After an operating time of 52 hours during which the hydrogen sulfide contents in the purified gas was determined throughout as <10 $mg/m^3$ the first operated adsorber was then shut off and the operation was switched to the other adsorber which meanwhile had been regenerated.

By treatment with hot inert gases of a temperature of about 450° C. for about 4 hours 22.3 kg of sulfur were obtained from the shut off adsorber. The feeding of this adsorber with fresh gas was resumed after 52 hours.

The discharged purified gas had the following contents:

$H_2S$: <10 $mg/m^3$
$SO_2$: <6 $mg/m^3$
$O_2$: <0.02 Vol.%

EXAMPLE 2

This example illustrates the operation shown in FIG. 2. A feed gas of a hydrogen sulfide contents of 7 $g/m^3$ was passed at a temperature of 150° C. through the adsorber 103 which was filled with activated carbon. The diameter of the adsorber was 37 cm and the height of the carbon bed was 1 m. Feed gas and added air were then introduced at a pressure of 15 bar.

At an amount of feed gas of 100 $m_n^3/h$ and a hydrogen sulfide contents of 7 $g/m^3$ the activated carbon was saturated with sulfur after 60 hours at 105% of its weight. After saturation the sulfur flowed out dropwise from the activated carbon. After further 160 hours, 90 kg of sulfur were obtained from this adsorber.

The gas discharged from the adsorber contained still about 1 g $S/m^3$ and was then passed for fine cleaning into one of the alternatingly operated adsorbers of the second group (adsorbers 112 and 113 in FIG. 2). These two adsorbers had a diameter of 37 cm and the activated carbon bed in the adsorbers had a height of 1.5 m.

After 160 hours the adsorbers were switched and from the fully charged adsorber, 16 kg sulfur were obtained by treatment with inert gas during 4 hours. The discharged purified gas had the following contents:

hydrogen sulfide: <5 $mg/m^3$
sulfur: <5 $mg/m^3$ and
oxygen: <0.02 vol.%

After 2000 hours of operation the adsorber 103 was subjected to treatment for 2 hours with an inert gas of a temperature of 500° C. This resulted in a complete regeneration of the activated carbon. From this adsorber 40 kg of sulfur were obtained with each regeneration. The same results were accomplished with the other adsorber.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for the elimination of sulfur compounds, including hydrogen sulfide, from gas mixtures by means of adsorbers containing activated carbon, of the type wherein a feed gas mixture together with oxygen and-/or sulfur dioxide is passed successively through at least two adsorbers respectively constituting a first and a second adsorbing stage, the improvement comprising maintaining a temperature during both stages above the melting point of sulfur and passing the gas through the first stage in such manner that the predominant portion of the elemental sulfur flows out in liquid form whereupon the residual elemental sulfur is passed in vaporous or mist-like form into the second stage, the first stage being continuously subjected to auto-regeneration and the necessity for regeneration of the carbon in the second stage being decreased because of the reduced amount of sulfur charged into the second stage.

2. The process of claim 1, further comprising adding oxygen to the gas mixture so as to obtain a hydrogen sulfide-oxygen molar ratio in the mixture between about 1:0.45 and 1:0.65 prior to passing the thus adjusted gas mixture into the first adsorber.

3. The process of claim 1, wherein the adsorption is carried out at a temperature of 120° to 240° C. and a pressure of 1 to 50 bar.

4. The process of claim 1, wherein the hydrogen sulfide contents in the initial gas is above 29 $H_2S/m^3$ and the pressure exceeds the saturation vapor pressure of the sulfur.

5. The process of claim 1, wherein in the first stage a single adsorber is employed while in the second stage two alternatingly operating adsorbers are used.

6. A process as recited in claim 5, for automatically eliminating sulfur compounds, including hydrogen sulfide, from gas mixtures by means of adsorbers containing activated carbon, further comprising in the second stage measuring the H$_2$S contents in the gas discharged from the first adsorber of the second stage and upon indication by control means that said hydrogen sulfide has reached a predetermined level directing the feed into the second adsorber of the second stage while the activated carbon in the first adsorber is subjected to regeneration and recovery of the sulfur.

7. The process of claim 1, wherein entry of the feed gas is effected at the top of the first stage adsorber.

8. The process of claim 1, wherein oxygen is added to the gas mixture so as to obtain a hydrogen sulfide-oxygen molar ratio in the mixture between about 1:0.45 and 1:0.65 prior to passing the thus adjusted gas mixture into the first stage and wherein the gas mixture includes sulfur dioxide and the amount of added oxygen is computed by the formula:

$$\text{Amount of } O_2(m_n^3/h) = \dot{V} \cdot (F/100) \cdot [\text{Vol.}\%H_2S - 2(\text{Vol.}\%SO_2 + \text{Vol.}\%O_2)], \quad \text{III}$$

$\dot{V}$ being the amount of feed gas in $m_n^3/h$ and F being a value between 0.45 and 0.65.

9. In a process for the automatic elimination of sulfur compounds, including hydrogen sulfide, from gas mixtures by means of adsorbers containing activated carbon of the type wherein a feed gas mixture is passed successively through at least two adsorbers respectively constituting a first and a second adsorbing stage, the improvement comprising maintaining a temperature during both stages above the melting point of sulfur, adding by use of automatic control means oxygen to the gas mixture so as to obtain a nitrogen sulfide-oxygen molar ratio in the mixture between about 1:0.45 and 1:0.65 prior to passing the thus adjusted gas mixture into the first stage, the required amount of the additional oxygen having been determined by the control means, and passing the gas through the first stage in such manner that the predominant portion of the elemental sulfur flows out in liquid form whereupon the residual elemental sulfur is passed in vaporous or mist-like form into the second stage, the first stage being continuously subjected to auto-regeneration and the necessity for regeneration of the carbon in the second stage being reduced because of the reduced amount of sulfur charged into that stage.

10. The process of claim 9, wherein in the first stage a single adsorber is employed while in the second stage two alternatingly operating adsorbers are used.

11. The process of claim 9, wherein in the second stage the automatic control means measure the H$_2$S contents in the gas discharged from the first of two alternatingly operating adsorbers which constitute the second stage and upon indication by said control means that said hydrogen sulfide contents has reached a predetermined level direct the feed into the second of said two alternatingly operating adsorbers while the activated carbon in the first adsorber is subjected to regeneration and recovery of the sulfur.

* * * * *